United States Patent [19]

Thigpen, Jr. et al.

[11] Patent Number: 4,572,297
[45] Date of Patent: Feb. 25, 1986

[54] METHOD OF FORMATION PERMEABILITY TREATMENT WITH ALKALI METAL HYDROXIDE

[75] Inventors: Arnold B. Thigpen, Jr., Houston; Mark D. Looney, Missouri City; Philip D. Fader, Katy, all of Tex.

[73] Assignee: Texaco Inc., White Plains, N.Y.

[21] Appl. No.: 628,548

[22] Filed: Jul. 6, 1984

[51] Int. Cl.$^4$ .............................................. E21B 43/27
[52] U.S. Cl. ..................................... 166/307; 166/273
[58] Field of Search ........... 166/271, 273, 274, 305 R, 166/307, 312; 252/8.55 B

[56] References Cited

U.S. PATENT DOCUMENTS

| | | |
|---|---|---|
| 1,651,311 | 11/1927 | Atkinson . |
| 2,679,294 | 5/1954 | Bond et al. ................... 166/307 X |
| 2,747,670 | 5/1956 | King et al. . |
| 3,292,697 | 12/1966 | Abdo et al. ................... 166/307 X |
| 3,396,790 | 8/1968 | Eaton . |
| 3,410,343 | 11/1968 | Abdo . |
| 3,530,937 | 9/1970 | Bernard ............................. 166/270 |
| 3,603,399 | 9/1971 | Reed ................................. 166/305 |
| 3,640,343 | 2/1972 | Darley .............................. 166/292 |
| 3,658,131 | 4/1972 | Biles ................................. 166/292 |
| 3,796,266 | 3/1974 | Carlin et al. ..................... 166/305 |
| 3,924,683 | 12/1975 | George et al. ................... 166/303 |
| 3,927,716 | 12/1975 | Burdyn et al. .................. 166/273 X |
| 4,031,959 | 6/1977 | Henderson ........................ 166/307 |
| 4,284,140 | 8/1981 | Sydansk et al. .................. 166/291 |
| 4,359,093 | 11/1982 | Bernard ............................ 166/273 |

OTHER PUBLICATIONS

Author's Reply to Discussion of Elevated-Temperature Caustic/Sandstone Interaction: Implications for Improving Oil Recovery; Robert D. Sydansk, SPE Journal, 12/82, p. 910.

"Alkaline EOR Involves Complex Interactions in Applicability, Recovery Mechanism, Design", Oil & Gas Journal, Aug. 6, 1984, p. 68.

"How to Stabilize Clays and Improve Injectivity", by B. F. Sloat and Dan Larsen, SPE Paper 12927, Presented at Rocky Mntn Regional Mtg in Casper, Wyoming on 5/21/84–5/23/84.

"Stabilizing Clays with Potassium Hydroxide", by R. D. Sydansk, SPE Paper 11721, Presented at Ventura, CA on 3/23–3/25/83.

*Primary Examiner*—George A. Suchfield
*Attorney, Agent, or Firm*—Jack H. Park; Kenneth R. Priem; Harold J. Delhommer

[57] ABSTRACT

The disclosed invention is a method for improving the permeability of an underground hydrocarbon reservoir containing clay particles or other silaceous fines where damage has occurred or may occur. The method requires the injection into the hydrocarbon reservoir of an aqueous treating solution having a pH greater than about 12 and comprising about 2% to about 25% by weight of an alkali metal hydroxide. The invention also includes the injection of an aqueous buffer solution into the reservoir before, and optionally, after the injection of the treating solution. The before and after buffer solutions should have a pH greater than about 12 and comprise about 0.5% to about 5% by weight of alkali metal hydroxide and about 0.5% to about 5% by weight of alkali metal salt. The high pH aqueous buffer solutions maintain reaction products in solution, minimizing precipitation within the formation from the treating solution.

18 Claims, 2 Drawing Figures

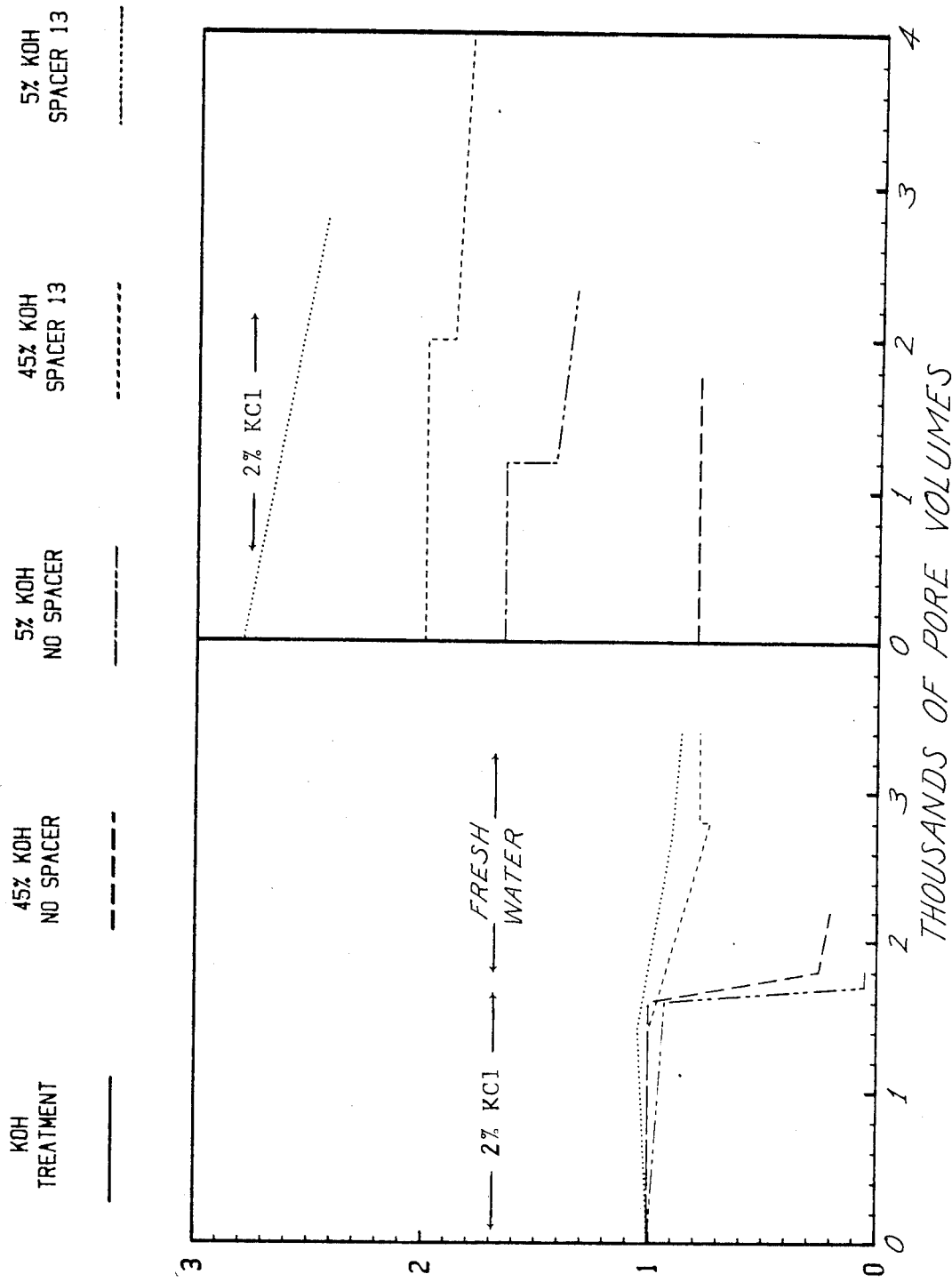

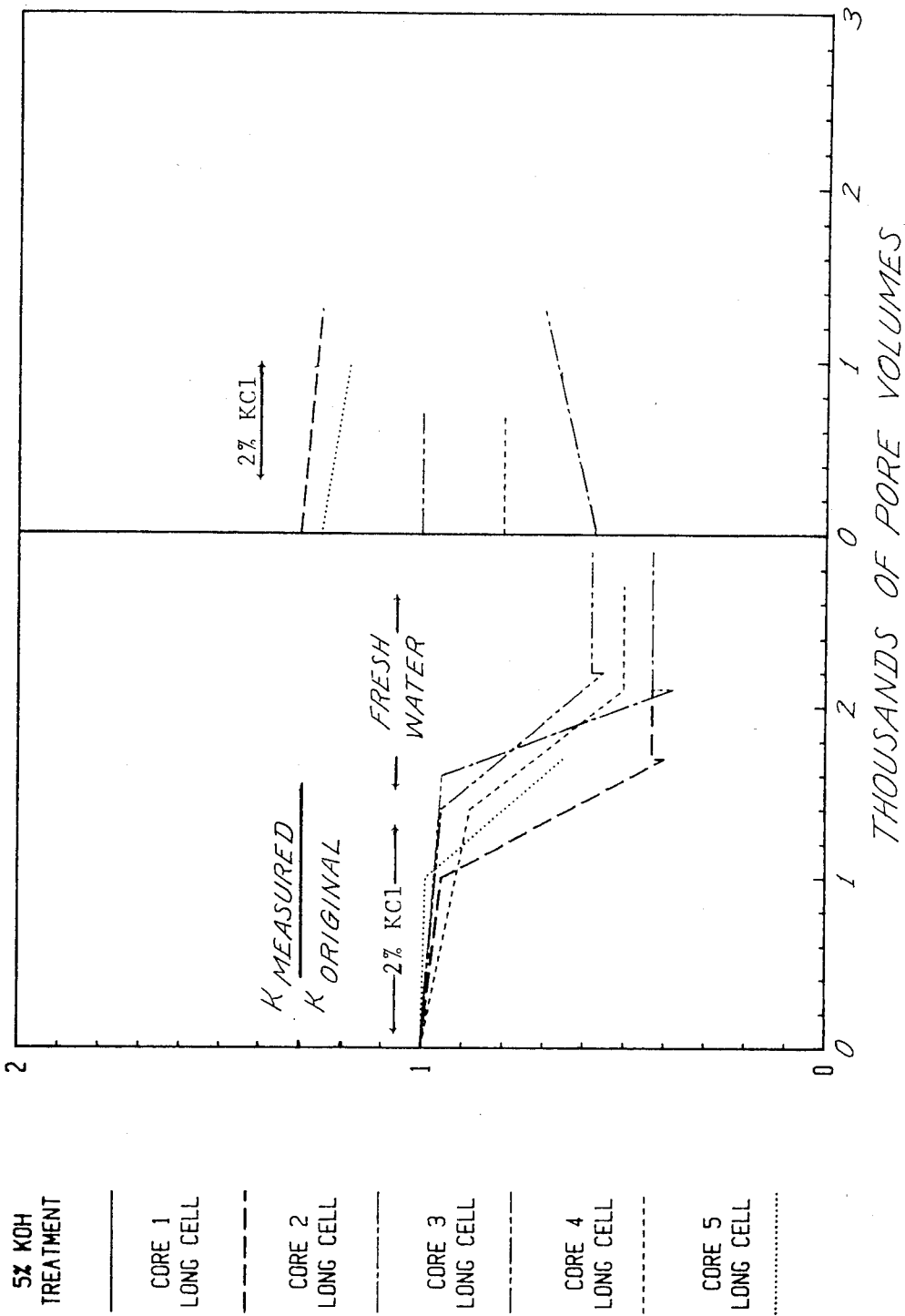

METHOD OF FORMATION PERMEABILITY TREATMENT WITH ALKALI METAL HYDROXIDE

BACKGROUND OF THE INVENTION

The present invention is directed to a method for increasing the permeability of underground hydrocarbon reservoirs containing clays and other fine particles where damage has occurred or may occur. More particularly, the invention concerns an alkaline flooding method wherein buffered, high pH solutions are employed to carry away the dissolved clays and other fines after reaction with the alkaline treating solution.

Numerous methods have been developed to improve the permeability of hydrocarbon formations, and ultimately, improve oil recovery from such formations. Various chemical and fracturing treatments represent the prior art. These techniques, however, will not work effectively in all situations.

Reservoir rock which contains clay particles is particularly susceptible to permeability damage from the clay particles. Several types of clay particles such as montmorillonite and illite, undergo substantial expansion upon contact with water. Furthermore, many types of mineral particles contained within the reservoir rock are mobile and tend to migrate within the reservoir rock and plug pores. These mobile fines reduce the permeability of the formation, forming bridges which fill and block pore constrictions. Acid and alkaline treatments are the chief measures employed to solve these permeability problems.

Acid treatments suffer from several drawbacks. Calcite cemented and weakly cemented formations tend to break down under such treatments, damaging the formation matrix. Second, permeability improvements from acid treatments in such formations may not last. Furthermore, acid treatments are often ineffective or perhaps damaging in reservoirs with high formation temperatures. At temperatures near or above 250° F., the acid may react too fast to achieve any penetration into the reservoir matrix.

One method of solving permeability damage from clay swelling and clay particle migration is to consolidate the clay fines by cementing them in place. U.S. Pat. No. 3,603,399 describes the use of a hydroxy aluminum solution to stabilize the water sensitive clays in the formation by cementing them in place. A similar approach is taken by the method of U.S. Pat. No. 4,031,959 wherein a solution of alkaline earth metal hydroxides is employed with alkaline earth metal salts to consolidate the clay fines in place and prevent their migration through the reservoir. U.S. Pat. No. 4,284,140 describes the use of potassium hydroxide solutions to stabilize the clay fines. See also SPE Paper No. 11721, "Stabilizing Clays With Potassium Hydroxide" by R. D. Sydansk, presented at the California Regional Meeting held in Ventura, Calif., Mar. 23-25, 1983 and Society of Petroleum Engineers Journal, Dec. 1982, Page 910.

A different approach is taken by U.S. Pat. No. 2,679,294 which employs a high pH solution of 5% or more sodium hydroxide to react with and dissolve clays and similar materials in the reservoir rock. A major problem with this approach, however, is that the dissolved silicate fines frequently precipitate in the formation after the alkaline treating fluids are spent. The subsequent precipitation of the silicate fines can substantially reduce the effect of the permeability treatment, and in some cases, reduce permeability below the level which existed prior to initial treatment. The use of alkali metal hydroxides or alkaline earth metal hydroxides is disclosed in U.S. Pat. Nos. 1,651,311 and 4,359,093 and relates to the alteration of the crude oil properties in order to attain increased production.

Other methods of employing alkaline treating solutions are described in U.S. Pat. Nos. 3,796,266; 3,924,683 and 2,955,653. U.S. Pat. No. 3,796,266 employs an alkaline agent such as sodium hydroxide along with a guanadine salt and an anionic surfactant. The mixture of sodium hydroxide and two surfactants in one slug followed by a water drive improves flooding and salt tolerance according to the authors. Hydroxide materials are also employed in U.S. Pat. No. 3,924,683 in a huff-puff steam process. However, the amounts of hydroxide added are very small (0.6% by weight and smaller). U.S. Pat. No. 2,955,653 employs a mixture of calcium hydroxide and calcium chloride at a pH below 12.6 to control shales and gravel packs.

U.S. Pat. Nos. 3,640,343 and 3,679,001 employ alkali metal silicates such as potassium silicate or sodium silicate along with sodium and potassium chloride salts in solution at a pH below 12 to control shales.

Aqueous slugs have been employed as spacers between the injection of various treating slugs, but not to carry away silicate fines from an alkaline hydroxide treatment. U.S. Pat. Nos. 2,747,670, 3,530,937 and 3,658,131 disclose the use of alkali solutions followed by a water slug and finally a solution designed to react with the alkali solution to form a precipitate for selectively plugging areas of lower permeability. These two references disclose a means of evening out permeability by decreasing the permeability of high permeability areas within the reservoir. U.S. Pat. No. 3,396,790 is similar to the above cited patents except that the first injected solution is a high viscosity solution which reacts with a second solution to form a precipitate for selectively plugging areas of the reservoir rock.

U.S. Pat. Nos. 3,292,697 and 3,410,343 disclose surfactant flooding methods in which alkaline materials are used to stabilize the shear thickening properties of the injected fluids and thereby help to increase recovery by increasing the sweep efficiency. U.S. Pat. No. 3,292,697 discloses the injection of water, followed by ethylenediaminetetraacetic acid to complex with formation salts followed by a surfactant mixture, which contains alkaline materials in order to stabilize the shear thickening properties of this fluid, and a water slug.

SUMMARY OF THE INVENTION

The instant invention is a method for improving the permeability of an underground hydrocarbon reservoir containing clay particles or other silaceous fines where damage has occurred or may occur. The method requires the injection into the hydrocarbon reservoir of an aqueous treating solution having a pH greater than about 12 and comprising about 2% to about 25% by weight of an alkali metal hydroxide. The instant method also requires that an aqueous solution which causes an in situ chemical buffering effect be injected into the reservoir before the injection of the treating solution.

The in situ buffering effect is promoted by a solution having a pH greater than about 12 and comprising about 0.5% to about 5% by weight of an alkali metal hydroxide and about 0.5% to about 5% by weight of an alkali metal salt, hereinafter referred to as a buffer solution. The high pH aqueous buffer solution is required in order to fully maintain the clays and silicates dissolved by the treatment in solution, thereby minimizing the precipitation within the formation which can lower permeability.

Preferably, a second aqueous buffer solution is injected into the reservoir after the injection of the treating solution. The use of the aqueous buffer solution before and after the treating solution is especially preferred when it is desired to overflush the treating solution into the formation and then produce the treating solution back through the well of injection. In this embodiment, the aqueous buffer solution will follow the treating solution back through the injection well carrying substantially all of the dissolved clays and other minerals in solution which may otherwise precipitate from the treating solution.

BRIEF DESCRIPTION OF THE DRAWINGS

FIG. 1 is a series of graphic plots illustrating permeability improvements with and without the use of buffered spacer solutions before and after the alkaline treatment.

FIG. 2 illustrates the permeability improvements which result from treatment of a relatively longer core with an alkaline treatment preceded and followed by a buffer solution.

DETAILED DESCRIPTION

Alkaline treatments of formations which are water sensitive due to the presence of clays and other fines can be substantially enhanced by the use of one or more relatively unreactive, high pH, buffer solutions in combination with the alkaline treatment. In most applications, the buffer solution should be spaced both ahead of and behind the highly reactive alkaline treatment solution. The buffer solutions maintain the solubility of silicate and aluminate clays and other minerals dissolved by the hydroxide treating solution. Consequently, the dissolved silicates and aluminates can be flushed from the region of the wellbore without significant precipitation and subsequent loss of permeability.

Alkaline solutions can be used to dissolve clays and other minerals and remove them from oil bearing formations, thus, preventing or removing permeability damage inflicted by mobile fines. In addition, alkaline solutions have certain advantages over other permeability stimulation methods, such as acid treatments in reservoirs with high formation temperatures. We have found that even at high temperatures, alkali hydroxide solutions, particularly potassium hydroxide solutions, react with a high degree of selectivity towards deleterious mineral components and therefore can penetrate far into the reservoir matrix to remove clays and fines while inflicting little damage to the rock matrix itself. The process is particularly applicable in sandstones with a high carbonate content which are not amenable to acidization treatments.

A serious problem, however, exists with the use of such alkaline treatments in the existing art. The minerals dissolved by the high pH alkaline treatments tend to be redeposited after treatment when the treating solution becomes spent or looses some of its reactivity. The precipitation of these minerals and consequent permeability damage can be prevented by the use of a relatively unreactive, high pH, buffered solution with the alkaline treating solution. A buffered solution injected before the treating solution, and preferably also after the treating solution, serves to keep the dissolved minerals in solution without reacting further with the formation.

Thus, the invention method (1) selectively reacts with and dissolves certain formation clays and minerals which can severely hamper permeability of the reservoir and (2) carries the dissolved silicates and aluminates away from the critical areas of the reservoir without precipitation, while at the same time leaving intact certain common cementation materials such as calcite and dolomite whose removal by other methods results in the undesirable loss of formation integrity. The tests discussed in the examples show the significantly higher permeabilities obtained when relatively unreactive, high pH, buffered solutions are injected into the reservoir before and after the injection of the high pH, highly reactive alkali metal hydroxide treating solution.

The instant invention requires the use of a treating solution comprising about 2% to about 25%, preferably about 4% to about 20% by weight of an alkali metal hydroxide. This will yield a highly reactive alkaline solution with a pH greater than about 12, and in most cases, a pH greater than about 13. At temperatures above 300° F., it may be desirable to employ a treating solution with a lower pH to lower the overall reactivity of the solution.

The alkali metal hydroxide can be prepared with exotic alkali metals such as rubidium, cesium, lithium and francium, but the use of such alkali metal hydroxides simply is not practical. Because of cost and availability, potassium hydroxide and sodium hydroxide are the alkali metal hydroxides of choice for both the treating solution as well as the buffer solutions. Ammonium hydroxide is also a possible treating solution component except for the fact that it yields inferior results when compared to potassium hydroxide and sodium hydroxide.

In general, potassium hydroxide is preferred over sodium hydroxide despite the lesser cost and greater availability of sodium hydroxide. This is due to the greater solubility of aluminates and silicates in potassium hydroxide solutions than sodium hydroxide solutions.

The alkali metal hydroxide treating solution must be preceeded by, and preferably is followed by a high pH, nonreactive aqueous buffer solution. The buffer solution comprises about 0.5% to about 5%, preferably about 1% to about 3% by weight of an alkali metal hydroxide and about 0.5% to about 5%, preferably about 1% to about 3% by weight of an alkali metal salt, giving said buffer solution a pH greater than about 12. The high pH of the buffer solution is necessary to maintain in solution the solubilized clays, quartz, aluminates and other reservoir material that is dissolved by the treating solution and prevent the precipitation of the dissolved materials prior to removal from the relevant matrix area. The buffer solutions should be relatively unreactive with the formation in order to prevent the dissolving of significant amounts of additional pore material by the buffer solutions.

The buffer solution most applicable for a given treatment will depend upon several factors including the alkali metal hydroxide used in the treatment solution, the geology of the formation to be treated and formation temperature. Any of the alkali metal hydroxides named above may be employed in the buffer solutions. Preferably, the alkali metal hydroxide employed in the buffer solution will be the same as that utilized for the treating solution. The use of the same alkali metal hydroxide in all solutions tends to yield better results.

The use of an alkali metal salt in the buffer solution is important in order to promote the buffering effect. It is preferable to employ an alkali metal salt having a cation which is the same as the cation of the alkali metal hydroxide. Better results are also obtained with the use of potassium chloride rather than sodium chloride in the buffer solution. Sodium chloride salt creates a higher risk of formation damage because certain sensitive formations are more susceptible to damage from sodium ions than potassium ions.

Sandstone formations offer the principle environment for the practice of the invention. However, the invention may also be applicable for other types of rock formations which contain fines and siliceous materials. Certain carbonate formations such as hard dolomitic formations can also be treated to increase permeabilities with the present invention.

The volume of treating and buffer solutions injected is principally a function of the location and volume of the area desired to be treated. It is preferred to inject about 75 to about 200 gallons of treating solution per vertical foot of reservoir and to inject similar volumes of buffer solution both before and after the treating solution. If it is only desired to treat the area immediately surrounding the wellbore, the volumes of choice may range from about 50 to about 100 gallons per foot of paying reservoir. If it is thought that permeability problems will exist at greater radial distances from the wellbore, then higher treating solution and buffer solution volumes are needed. In most cases, it is desired to inject about 100 to about 150 gallons of treating solution per vertical foot of reservoir pay zone.

The volume of buffer solution injected before the treating solution can be substantially reduced below the above ranges if it is not desired to produce the treating and buffer solutions back through the well of injection. But it is suggested that the volume of buffer solution injected prior to the treating solution be similar to the injected volumes of the treating solution and the after buffer solution for optimum results. A large volume of buffer solution prior to the treating solution is not as important if it is desired to drive the treating solution through the formation away from the well of injection. However, a first buffer solution is still needed to protect the treating solution slug from dilution or adverse reactions with formation brines.

If the formation fluids contain substantial amounts of scale forming ions such as calcium and magnesium, it may also be desirable to inject a preflush fluid before the first buffer solution to insulate the buffer solution from incompatible formation fluids. A neutral brine relatively free of scale forming ions is a suggested preflush fluid.

When treating the formation immediately surrounding the wellbore, the second buffer solution can usually be omitted without adverse consequences. In such a case, the treating solution will occupy the bottom of the wellbore as well as the surrounding formation and can easily be produced back through the well of injection without undue precipitation from the treating solution.

The treating solution must be kept in contact with reservoir rock for a time sufficient to react with the reservoir and dissolve clays and other fines. This contact time will vary considerably according to the geology of the reservoir, the composition and concentration of treating solution and the formation temperature. Preferred contact time is from about 1 hour to about 4 hours, but in some cases the contact time may range from about thirty minutes to about 24 hours. Shorter contact times are highly desirable due to the high cost of crews, equipment and lost production. Generally, the contact time must be sufficient to give the treating solution time to react with and dissolve the clays while at the same time not destroying the formation matrix or building up too many dissolved fines to keep in solution with the treating and buffer solutions. Too long of a reaction time may damage the formation matrix and make it very difficult to remove all of the dissolved aluminates and silicates from the treated area.

Formation temperature is a crucial factor in determining contact time. The process will be highly effective in most reservoir matrices with a formation temperature and treating solution temperature of about 300° F. and a treating solution concentration of about 5% potassium hydroxide. At these conditions, the required contact time would be about 1 hour. But with cooler temperatures such as 200° F., the contact time with the reservoir rock must be lengthened or the concentration of the treating solution must be substantially increased. A 20% potassium hydroxide treating solution is recommended in order to maintain contact time at about 1 hour at 200° F. formation temperature. It is generally preferred to pay for a more highly concentrated solution to speed up reaction times rather than pay for longer contact times because of the substantially higher labor and equipment costs when compared to the cost of additional chemicals for the treating solution.

The following examples will further illustrate the novel alkaline stimulation technique for the present invention. These examples are given by way of illustration and not as limitations on the scope of the invention. Thus, it should be understood that the composition and concentration of the treating and buffer solutions may be varied to achieve similar results within the scope of the invention.

FIG. 1

The method of the present invention was tested on several Berea sandstone cores in the laboratory. The increase in permeability was much greater and longer lasting when the relatively unreactive, high pH, buffer solutions were employed.

One inch diameter, one inch thick, unfired Berea sandstone cores were employed in a Hassler type permeability cell. These cores had a classic sandstone composition of about 80% quartz and about 10% total clay. About 4% by weight of the cores were illite clays and about 5% by weight of the cores were kaolinite and chlorite clays. Some of the cores had about a 5% expandability fraction of illite clay. None of the cores contained significant amounts of montmorillonite.

The before and after buffer solutions were injected at 300° F. and contained 1.5% potassium hydroxide and 1.9% potassium chloride. The solutions buffered to a pH of 12.8 and had little reaction with the cores. The treating solutions contained 5% and 45% potassium hydroxide.

FIG. 1 plots the ratio of measured permeability over the original permeability versus the thousands of pore volume throughput run through the four cores of FIG. 1. The left side of FIG. 1 shows the reduction of permeability that resulted in all four cores when they were flooded with fresh water.

The strong vertical bar in the middle of FIG. 1 represents the potassium hydroxide treatment with and without said spacer solution before and after the treating solution. The graphic plots on the right side of FIG. 1 illustrate the resulting permeability ratios (defined as the present permeability divided by the initial permeability) after the potassium hydroxide treatment. It is clear that the use of the buffer spacer solutions containing 1.5% potassium hydroxide and 1.9% potassium chloride yielded a substantially larger improvement in permeability than the same potassium hydroxide treatments without the before and after buffered spacer solutions. In addition, the permeabilities were fairly stable for a lengthy time after treatment.

The 5% KOH treatment with buffered solutions yielded a permeability ratio of about 2.8 compared to a ratio of about 1.7 without the buffered spacer solutions. The permeability ratios after treatment with 45% KOH with and without buffer solutions were about 2.0 and 0.8, respectively.

FIG. 2

A longer core was created by setting up five one inch diameter, one inch long cores in a series for FIG. 2. The results graphed in FIG. 2 illustrate that the 5% KOH treatment with before and after buffered spacers penetrated and improved the permeability of all five cells (cores) of the long cell. An acid treatment would chew up the first core and never reach the end of the long cell.

Many other variations and modifications may be made in the concepts described above by those skilled in the art without departing from the concepts of the present invention. Accordingly, it should be clearly understood the concepts disclosed in the description are illustrative only and are not intended as limitations on the scope of the invention.

What is claimed is:

1. A method for improving the permeability of an underground hydrocarbon reservoir containing clays and other fine particles where damage has occurred or may occur, comprising:
    injecting an aqueous buffer solution into the hydrocarbon reservoir through a well, said buffer solution having a pH greater than about 12 and comprising about 0.5% to about 5% by weight of an alkali metal hydroxide and about 0.5% to about 5% by weight of an alkali metal salt; and
    injecting an aqueous treating solution into the hydrocarbon reservoir after the buffer solution, said treating solution having a pH greater than about 12 and comprising about 2% to about 25% by weight of an alkali metal hydroxide;
    maintaining contact between the treating solution and the portion of the reservoir desired to be treated for a time of about thirty minutes to about 24 hours.

2. The method of claim 1, wherein the treating solution comprises about 3% to about 10% by weight of an alkali metal hydroxide, the desired contact time between the treating solution and the reservoir is about thirty minutes to about four hours and the formation temperature is about 100° F. to about 400° F.

3. The method of claim 1, wherein the desired contact time between the treating solution and the reservoir is inversely proportional to reservoir temperature.

4. The method of claim 1, wherein about 50 to about 200 gallons of treating solution per vertical foot of hydrocarbon reservoir is injected into the reservoir.

5. The method of claim 1, wherein about 50 to about 200 gallons of buffer solution per vertical foot of hydrocarbon reservoir is injected into the reservoir.

6. The method of claim 1, wherein the treating solution is injected into the reservoir a distance of about 25 to about 200 feet from the well of injection.

7. The method of claim 1, further comprising the injection of a drive fluid after the treating solution to drive the treating solution and buffer solution a greater distance into the reservoir from the well of injection.

8. The method of claim 1, further comprising the step of producing the treating solution and buffer solution back through the well of injection.

9. The method of claim 1, wherein the solutions are injected through a production well.

10. The method of claim 1, wherein the alkali metal hydroxide of the treating solution is potassium hydroxide or sodium hydroxide.

11. The method of claim 1, wherein the alkali metal hydroxide of the buffer solution is potassium hydroxide or sodium hydroxide.

12. The method of claim 1, wherein the alkali metal salt is sodium chloride or potassium chloride.

13. The method of claim 1, further comprising the injection of a brine into the formation prior to the injection of the buffer solution.

14. The method of claim 1, further comprising the injection of a second aqueous buffer solution after the injection of the treating solution, said second aqueous buffer solution having a pH greater than about 12 and comprising about 0.5% to about 5% by weight of an alkali metal hydroxide and about 0.5% to about 5% by weight of an alkali metal salt.

15. The method of claim 14, wherein about 25 to about 200 gallons of second buffer solution per vertical foot of hydrocarbon reservoir is injected into the reservoir.

16. The method of claim 14, wherein the alkali metal hydroxide of the second buffer solution is potassium hydroxide or sodium hydroxide.

17. The method of claim 14, wherein the alkali metal salt is potassium chloride or sodium chloride.

18. A method of improving the permeability of an underground hydrocarbon reservoir containing clays and other fine particles where damage has occurred or may occur, comprising:
    injecting into the reservoir through a well an aqueous buffer solution having a pH greater than about 12 and comprising about 1% to about 3% by weight of potassium hydroxide and about 1% to about 3% by weight of potassium chloride, said buffer solution being injected in a volume of about 50 to about 150 gallons per vertical foot of the hydrocarbon reservoir;
    injecting into the hydrocarbon reservoir through said well after the buffer solution an aqueous treating solution having a pH greater than about 12 and comprising about 4% to about 20% by weight of potassium hydroxide, said treating solution being injected in a volume of about 75 to about 150 gallons per vertical foot of hydrocarbon reservoir;
    injecting a second aqueous buffer solution into the reservoir following the injection of the treating solution, said second buffer solution having a pH greater than about 12 and comprising about 1% to about 3% by weight of potassium hydroxide and about 1% to about 3% by weight of potassium chloride, said second buffer solution being injected in a volume of about 75 to about 150 gallons per vertical foot of hydrocarbon reservoir; and
    maintaining contact between the treating solution and the portion of the reservoir desired to be treated for a period of about thirty minutes to about four hours.

* * * * *